United States Patent

Sorensen et al.

[11] 3,958,400
[45] May 25, 1976

[54] SICKLE BAR MOWER MOUNTING APPARATUS

[75] Inventors: Robert Sorensen, Glen Ellyn; Paul C. Gordon, Hinsdale, both of Ill.

[73] Assignee: International Harvester Company, Chicago, Ill.

[22] Filed: Apr. 10, 1975

[21] Appl. No.: 566,879

[52] U.S. Cl. ............................. 56/12.6; 56/15.2; 56/15.7
[51] Int. Cl.² ...................................... A01D 35/08
[58] Field of Search ............... 56/12.6, 15.2, 15.5, 56/15.7, 15.8, 15.9, 16.2, 264

[56] References Cited
UNITED STATES PATENTS

| | | | |
|---|---|---|---|
| 2,495,986 | 1/1950 | Schroeppel | 56/15.7 |
| 3,791,115 | 2/1974 | Nelsen et al. | 56/15.2 X |

*Primary Examiner*—Hugh R. Chamblee
*Assistant Examiner*—J. N. Eskovitz
*Attorney, Agent, or Firm*—Dennis K. Sullivan; Floyd B. Harman

[57] ABSTRACT

Mounting apparatus for connecting a sickle bar mower to a hitch frame adapted for attachment to a tractor comprising a pair of laterally spaced links interconnecting the hitch frame with the drag bar and cutterbar assembly to form a generally horizontal four bar linkage having one rigid corner, the link adjacent the rigid corner being resilient in the transverse direction.

9 Claims, 2 Drawing Figures

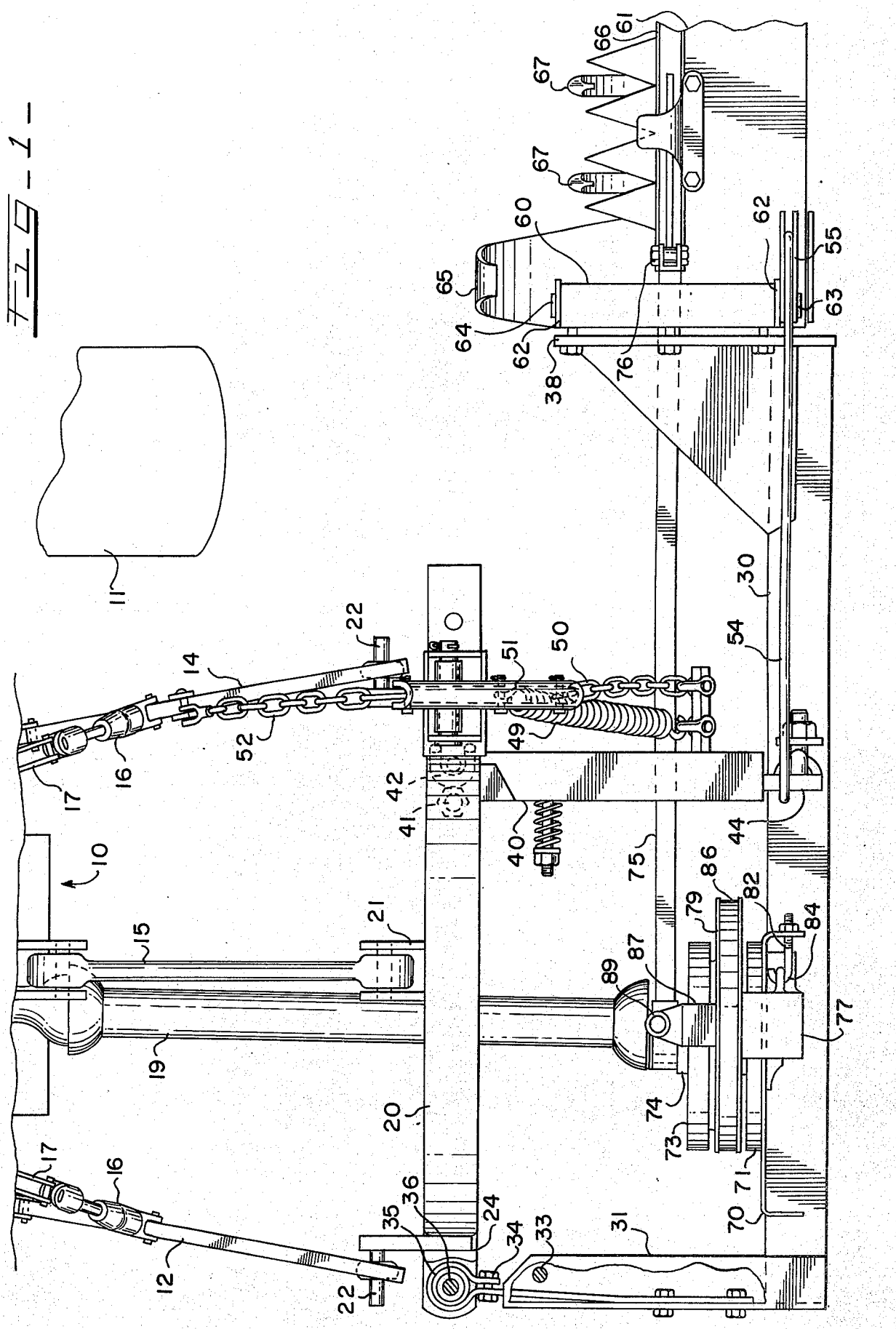

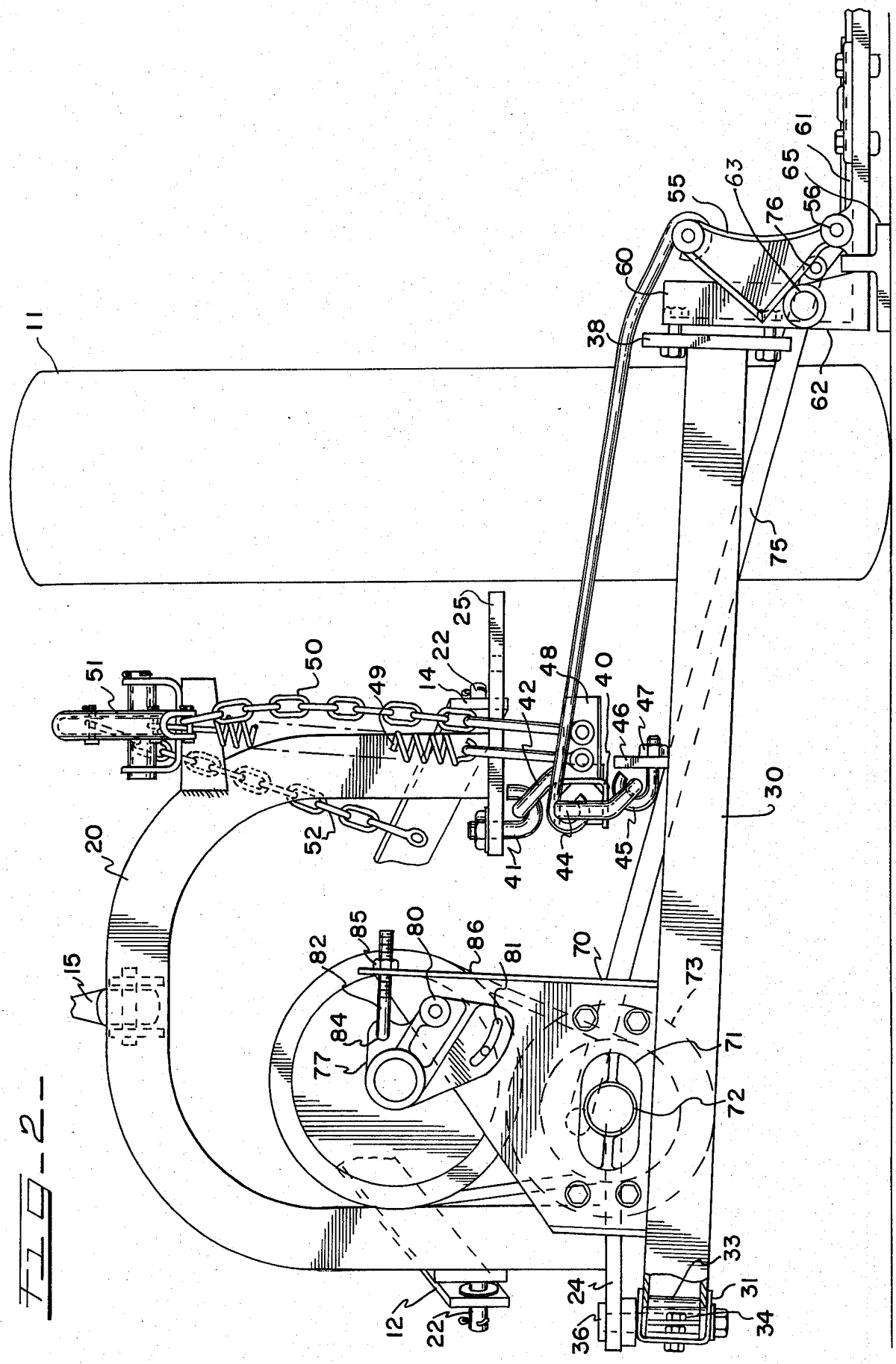

SICKLE BAR MOWER MOUNTING APPARATUS

CROSS REFERENCE TO RELATED APPLICATION

This application is related to application Ser. No. 566,877, filed concurrently herewith by Robert Sorensen and Richard A. Zablocki, entitled CUTTERBAR CONTROL SYSTEM and to application Ser. No. 566,878, filed concurrently herewith by Robert Sorensen, Paul C. Gordon, and Richard A. Zablocki, entitled PITMAN MOWER, both of the above applications being assigned to the assignee hereof.

BACKGROUND OF THE INVENTION

This invention is related to sickle bar mowers and more particularly, to a simple inexpensive mounting linkage for mounting the operating portion of the mower to a hitch frame to reduce the transmission of vibrations from the sickle to the tractor.

Sickle bar mowers inherently produce a relatively high oscillating force in the transverse direction due to the inertia of the reciprocating knife. This oscillating force is usually transmitted through the mower frame and tractor hitch to the tractor causing eccessive vibrations which can result in early failure of components and fatigue to the operator.

DESCRIPTION OF THE PRIOR ART

In the past others have tried to eliminate the effect of these oscillating forces by counterbalancing the mower drive. See, for example, the Orelind U.S. Pat. No. 2,824,416, for wobble-drive type mowers. For the less expensive pitman drive mowers, adding a counterweight to the flywheel opposite the pitman pin will oppose the reciprocating forces of the knife; however, it will also produce undesirable vertical forces when the knife is at mid-stroke. This problem has been attacked by providing the mower with an additional counter-rotating flywheel which is gear driven from the driving flywheel. These flywheels team up to counterbalance the knife at end of stroke and counterbalance each other at mid stroke but result in a more expensive and complicated drive system, such as shown in the Scarnato et al. U.S. Pat. No. 3,786,620.

A further disadvantage of both of the above systems, aside from their complexity and expense, is that the lateral shaking motion of the cutterbar produced by the oscillating inertia forces of the reciprocating knife is, in fact, very desirable from a standpoint of keeping the cutterbar clean and improving the cutting action of the knife. It has been our experience that a mower having this shaking action of the cutterbar will operate in heavier tangled crops where a balanced mower of the type described above would be less effective.

Still others have approached the problem by providing rubber mountings of the mower frame to the hitch frame or tractor. Examples of these are found in Simpson U.S. Pat. No. 2,311,095, Schroeppel U.S. Pat. No. 2,495,986, Goss U.S. Pat. No. 2,699,025, and in Scarnato et al. U.S. Pat. Nos. 3,092,947 and 3,302,376. The two Scarnato et al. patents teach vertical pendulum mower mountings wherein the pendulum is mounted to its pivot by a rubber cushioning ring. The problem with this type of mounting is that it apparently requires a fairly large pendulum casting which adds to the vibrating mass and which also has proved to be rather expensive compared to competitive designs. The Simpson and Goss patents illustrate a simple rubber pad mounting of the mower to the tractor frame, which may be acceptable for the side mounted mowers shown therein but would not be easily accomplished on a rear mounted mower. The Schroeppel patent teaches a simple pitman mower system wherein the left end of the drag bar is L-shaped and extends into a rubber cushioning ring mounted to the left side of the hitch frame. A major defect in Schroeppel is that the pitman drive components are mounted on the tractor hitch frame rather than on the drag bar. A great majority of the vibrational forces which occur in a pitman mower are not in the cutterbar, which Schroeppel isolates, but in the sickle, which slides in the cutter bar but is not attached thereto, the pitman stick and the drive system. Schroeppel connects these to the portion of the frame directly connected to the tractor. Thus, the Schroeppel design would not do much vibration isolating. The rubber ring connection also allows freedom of the drag bar in the fore and aft vertical plane which is undesirable for maintaining the running fore and aft vertical tilt of the cutterbar. Moreover, as with the other frame-isolated systems described, rubber cushioning can be undesirable from a life standpoint since its resiliency is affected by repeated vibrational loading cycles and by deterioration due to the elements. Lastly it is noted that the Schroeppel design was utilized at one time in production but has since been discarded.

SUMMARY OF THE INVENTION

Accordingly, it is the primary object of this invention to provide a simple and inexpensive sickle bar mower having mounting linkage for attaching the cutterbar to the frame which will permit lateral oscillation of the cutterbar while inhibiting the transmission of the vibrations produced by the sickle to the tractor hitch and tractor.

It is a further object of the invention to inhibit vibrations developed in the sickle drive apparatus from being transferred to the hitch frame and the tractor.

In accordance with the invention, these objects are broadly met by providing a pair of links between the hitch frame and the drag bar-cutterbar combination to form a generally horizontal four bar parallel linkage. While it will be readily recognized that such a linkage per se would isolate the cutterbar from the hitch frame, it is necessary to provide means for maintaining the transverse position of the mower relative to the tractor. In accordance with our invention, this is accomplished by providing one corner of the four bar linkage with a rigid joint, the link adjacent that joint being resilient in the transverse direction.

More specifically, the drag bar, which carries the sickle drive apparatus, is connected to the hitch frame at the left side by a leaf spring pivoted at its forward end to the hitch frame and rigidly connected at its rearward end to the drag bar. At the right side of the hitch frame, a pull bar interconnects the hitch frame with the drag bar, the joints providing pivotal movement of the pull bar relative to the hitch frame and to the drag bar in the horizontal plane. As will be seen in considerably greater detail in the referenced co-pending application, Ser. No. 566,877, the pull bar is also the breakaway link and a portion of the mower lift system. Although other means are known for accomplishing these functions without interfering with the function of the present invention, it is believed that the present invention can best be utilized in conjunction with the invention of the related application.

DESCRIPTION OF THE DRAWINGS

Thus, an uncomplicated, inexpensive, vibration-inhibiting mower mounting system is provided by our invention as will be readily apparent to those skilled in the art upon examination of the drawings in which:

FIG. 1 is a top view of a sickle bar mower incorporating our invention and a portion of the tractor to which it is mounted; and FIG. 2 is a rear view of the mower and tractor of FIG. 1.

DESCRIPTION OF THE PREFERRED EMBODIMENT

In the ensuing description, in accordance with the convention in the art, the terms "left", "right", "front", and "rear" are to be considered as viewed by one standing behind the tractor or implement facing it. Obviously, the invention may be utilized on the left side of the tractor as well as the illustrated right side by a mirror image reversal of parts.

Turning to the drawings, there is shown the rear portion of a conventional agricultural tractor generally designated 10, including a right ground wheel 11, which is provided with a vertically movable three point free link hitch linkage in accordance with the art including a pair of left and right lower hitch links 12 and 14 respectively and an upper center link 15 pivotally mounted at their forward ends to the tractor 10 for vertical movement. A pair of lift links 16 are pivotally mounted respectively to the lower links 12 and 14 intermediate their ends and extend upwardly to pivotal connections to the powered tractor lift arms 17 which rotate in a vertical plane to raise and lower the hitch links. The tractor is provided with a standard power take-off means to which may be connected an extendable PTO shaft 19 for driving associated implements such as our mower.

The mower comprises an inverted U-shaped hitch frame or bail 20 of rectangular cross section having a generally upright transverse orientation. Integrally mounted to the forward side of the top center portion of the bail 20 is a clevis 21 to which is pinned the rearward end of the upper hitch link 15. Each of the legs of the bail 20 are provided respectively with an outwardly extending pin 22 which receives one of the lower hitch links 12 and 14, the pins 22 being arranged along a common axis. The hitch links thus maintain the bail 20 in an upright position while enabling it to be moved vertically. The left leg of the bail 20 extends downwardly from the pin 22 to a horizontal mounting plate 24 and the right leg extends downwardly to a horizontal mounting plate 25 which is at a higher level to accommodate the geometry of the lifting linkage as may be seen in FIG. 2.

The mower further comprises coupling means including a drag bar 30 and cutterbar 61 which, in the normal operating position, extend transversely, or parallel to the bail 20, in a generally horizontal plane. The left end of the drag bar 30 is provided with a U-shaped channel member 31 welded thereto and having an open right side, the member 31 extending forwardly towards the bail 20 but not touching it. A fore-and-aft extending steel leaf spring 32 is attached at its rearward end to the channel member 31 as by bolts and is bent away therefrom to permit relative movement. The channel member 31 is also provided with a vertical bumper member 33 which may be a bolt spaced to the right side of the spring 32, the bumper 33 and the right side of the channel member 31 preventing excessive deflection of the spring 32 but not normally touching it.

The forward end of the leaf spring 32 is wrapped around and tightly clamped as by bolt assembly 34, to a bushing 35 which is mounted for free rotation on a vertical pin 36 depending downwardly from the left mounting plate 24, a nut and washer retaining the bushing 35 on the pin 36. The leaf spring 32 has its major cross sectional dimension in the vertical direction, thereby providing its major resiliency in the transverse direction. To permit a small amount of pivoting of the drag bar 30 relative to the bail during the lifting operation, the leaf spring also is capable of torsional deflection on the order of about 5° either way. Thus, the leaf spring 32 provides a link between the drag bar 30 and the bail 20, the link being pivotally mounted at its forward end to the hitch frame 20 and rigidly mounted to the drag bar 30 and being resilient in the transverse direction.

Interconnecting the right leg of the bail 20 with the intermediate portion of the drag bar 30 is a generally fore-and-aft extending pull bar assembly 40. The connection between the forward end of the pull bar assembly 40 and the bail 20 is accomplished with a threaded hook 41 depending downwardly from the right horizontal plate 24, a nut drawing the free end of the hook 41 up into close proximity to the plate 24 transverse of the threaded shank thereof. The hook engages a U-shaped eye member 42 welded to the side of the forward portion of the pull bar assembly and extending diagonally above the center thereof in the operating position, the axis of the U-shaped eye being in the transverse plane. As thus constructed, the hook 41 permits universal pivoting movement of the pull bar assembly 40 thereabout. The rearward end of the pull bar assembly 40 is provided with an oval shaped eye member 44, the opening of the oval eye being transverse of the pull bar assembly, which extends downwardly and rightwardly from the pull bar assembly 40 whereat it receives a threaded hook 45 which is mounted to and drawn up against, as by nut 47, an upstanding plate 46 affixed to the drag bar 30, the opening of the hook 45 being fore-and-aft. As thus constructed, the hook 45 permits universal pivoting movement of the pull bar assembly 40 thereabout.

Thus, the leaf spring 32 and pull bar assembly 40 comprise a pair of links which interconnect the drag bar 30 and the hitch frame 20 to form a generally horizontal four bar parallel linkage, the hitch frame 20 being the stationary link. It can be seen from the above description that three of the four joints of the four bar linkage provide for pivotal movement in the horizontal plane while the fourth, the joint between the leaf spring 32 and drag bar 30, is rigid and that the link adjacent the rigid joint, that is the leaf spring 32, is resilient in the transverse direction. The rigid joint combined with the self-centering nature of the leaf spring 32 maintains the mower in its lateral position relative to the tractor.

The drag bar 30 extends rightwardly from the pull bar assembly 40 to a vertical extending cutterbar mounting plate 38 outboard of the tractor wheel 11. A hinge member 60 is bolted to the mounting plate 38 and extends downwardly to a bifurcated end whereat a transversely extending mower cutterbar 61 having hinge ears 62 is pivotally mounted thereto by pins 63 and 64 having a common fore and aft axis to provide for vertical swinging of the cutterbar 61 thereabout.

The cutterbar 61 is of conventional design and is provided with an inner gauging shoe 65 and an outer gauging shoe (not shown). Mounted on the forward side of the cutterbar are a conventional transversely reciprocating sickle 66 and mower guards 67.

The mower drive means comprises an upstanding transverse plate 70 mounted on the drag bar 30 between the leaf spring 32 and the pull bar assembly 40. A bearing housing 71 is bolted to the lower part of the forward side of the plate 70 and extends therethrough. A shaft 72 is journaled in the housing 71 and extends forwardly whereat a flywheel 73 having a sheave is mounted thereon. The forward side of the flywheel 73 is provided with means 74 for pivotally attaching a pitman stick 75 thereto, the flywheel being counterweighted against the mass of the mounting means 74 and about half of the weight of the pitman stick 75 in accordance with the art. The pitman stick 75 extends transversely downwardly to a pivotal connection with the sickle 66 as at 76. A journal arm 77, on which is journalled an upper drive sheave 79, is pivotally mounted to the upper portion of the plate 70 about pin 80. The journal arm is provided with an arcuate slot 81 concentric about the pin 80 through which a bolt may be inserted into the plate 70 to maintain the journal arm 71 in position. A J-bolt 82 hooks onto the journal arm as at 84 and extends through an outturned edge of the plate 70 whereat it is provided with a nut 85 which may be used to tension a belt 86 extending around the drive sheave 79 and the sheave on the flywheel 73. A stub shaft 87 extends forwardly from the drive sheave to a universal joint assembly 89 providing a power connection with the PTO shaft 19.

As is described in detail in the referenced copending application, Ser. No. 566,877, which is incorporated by reference herein, the pull bar assembly 40 also may rotate about an axis generally longitudinal thereof which extends between the hook 41 and hook 45. This action enables the pull bar assembly 40 to become part of the lifting linkage for the mower. To this end, the pull bar assembly 40 is provided with a radial lever arm 48 to which are connected a float spring 49 and lift chain 50, the opposite ends of the float spring and lift chain being connected to one end of a rocker lever 51 pivotally mounted at the upper portion of bail 20 the opposite end of the lever 51 being connected by a chain 52 to the intermediate portion of the lower link 14. With this arrangement, when the three point hitch links are raised, a downward pull will be exerted on the chain 52 which will, in turn, exert an upward pull on the lifting chain 50 to rotate the lever arm 48 and pull bar assembly 40 in a generally counterclockwise direction as viewed in FIG. 2. This counterclockwise rotation will exert a leftward pull on the gag or cutterbar control link 54 which is connected to the upper portion of the eye 44 away from the hook 45. The gag link 54 is connected to the upper end of a lift lever 55 which is pivotally mounted to the cutterbar 61 as at 56, a medial portion of the lever 55 resting on the ear 62 of the cutterbar 61 to provide a fulcrum point therefor. Thus, a leftward pull on the gag link 54 will cause the cutterbar assembly to pivot about the pin 63 raising the outer end of the cutterbar. Further, in accordance with the referenced copending application, the pull bar assembly 40 is longitudinally extendable in response to overload conditions on the cutterbar 61. This will cause the entire drag bar assembly to pivot about the pin 36.

In the operation of the mower, the reciprocation of the sickle 66 will cause oscillating loads to be transmitted through the pitman stick 75 and flywheel 73 to the drag bar 30 and also by friction through the cutterbar 61 to the drag bar 30. The drag bar and cutterbar will thus oscillate transversely, generally about an eighth of an inch in either direction. This oscillation of the cutterbar is beneficial to the cutting efficiency and the cleaning of the cutterbar. The transverse oscillations or deflections of the drag bar 30 cause the rearward end of the leaf spring 32 to deflect. However, since the forward end of the leaf spring is pivotally mounted to the bail or hitch frame 20, very little of the vibration of the drag bar and rearward end of the leaf spring is transmitted to the frame and hitch links. The slight vibration that is transmitted is believed to be due to the oscillating deflections of the leaf spring imposing a side load on the pin 36. A softer spring constant would reduce this even further. Similarly, because the pull bar assembly is capable of pivotal movement in the horizontal plane relative to both the bail and the drag bar, almost no vibration is transferred through that link to the bail 20.

Thus, there has been provided in accordance with the invention a sickle bar mower mounting apparatus that fully satisfies the objects, aims, and advantages set forth above. While the invention has been described in connection with a specific embodiment thereof, it is evident that many alternatives, modifications, and variations will be apparent to those skilled in the art in light of the foregoing description. For example, if the vertical pivot at pin 36 were not considered necessary from a breakaway standpoint, that connection might also be rigid without a great loss in vibration inhibiting by the leaf spring arrangement described, provided the spring constant were halved. Accordingly, it is intended to embrace all such alternatives modifications and variations as fall within the spirit and broad scope of the appended claims.

What is claimed is:

1. A sickle bar mower adapted for attachment to a tractor comprising:
   a hitch frame;
   coupling frame means comprising a transversely extending drag bar and a transversely extending cutterbar attached thereto, said cutterbar including a transversely reciprocating sickle;
   sickle drive means mounted on said coupling frame means, said drive means being drivable from a source of power associated with said tractor; and
   a pair of generally fore-and-aft extending links interconnecting said hitch frame and said coupling frame means to form a generally horizontal four bar parallel linkage, one joint of said linkage being restrained from pivotal movement in the horizontal plane, the link adjacent said joint comprising metallic spring means resilient in the transverse direction.

2. The invention in accordance with claim 1 wherein said adjacent link is a leaf spring.

3. The invention in accordance with claim 2 and the major cross-sectional dimension of said leaf spring being vertical.

4. The invention in accordance with claim 2 and said leaf spring being pivotally attached to said hitch frame and rigidly attached to said drag bar.

5. The invention in accordance with claim 1 and the other of said links being connected to said hitch frame by means permitting rotation therebetween in the horizontal plane, said other link being connected to said drag bar by means permitting rotation therebetween in the horizontal plane.

6. In combination, a reciprocating mower and tractor, said tractor having a power operated tractor hitch means, said mower comprising:
 a transverse drag bar;
 a transverse cutterbar including a reciprocal sickle mounted to said drag bar and extending transversely therefrom;
 drive means for said sickle mounted on said drag bar, said drive means being powered by said tractor;
 a leaf spring resilient in the transverse direction interconnecting said tractor hitch means with the drag bar adjacent the end thereof opposite said cutterbar; and
 a pull bar interconnecting said tractor hitch means with said drag bar intermediate the ends thereof.

7. The invention in accordance with claim 6 and one end of said leaf spring being pivotally connected to its adjacent member for rotation about a vertical axis.

8. Apparatus for mounting a pitman mower to a tractor having a vertically movable hitch, said mower having transverse cutterbar means including a drag bar, a cutterbar, a sickle and drive means therefor, comprising:
 an upright bail adapted for connection to said tractor hitch and having a generally transverse orientation;
 a first generally fore-and-aft extending link connecting said cutterbar means to said bail;
 a second generally fore-and-aft link, laterally spaced from said first link, connecting said cutterbar means to said bail, said first and second links being disposed to permit limited parallel transverse movement of said cutterbar means relative to said bail, one of said links comprising a leaf spring having one end connected to said cutterbar means by means forming a horizontal torque resistant joint therebetween.

9. The invention in accordance with claim 8 and the other end of said leaf spring being pivotally connected by means to said bail for rotation about a vertical axis.

* * * * *